United States Patent [19]
Ishikawa

[11] Patent Number: 5,875,753
[45] Date of Patent: Mar. 2, 1999

[54] BALANCER APPARATUS FOR ENGINE

[75] Inventor: Makoto Ishikawa, Mishima, Japan

[73] Assignee: Toyota Jidosha Kabushiki Kaisha, Toyota, Japan

[21] Appl. No.: 938,624

[22] Filed: Sep. 26, 1997

[30] Foreign Application Priority Data

Dec. 27, 1996 [JP] Japan ................................. 8-351127
Feb. 7, 1997 [JP] Japan ................................. 9-025583

[51] Int. Cl.⁶ ........................................................ F01L 7/00
[52] U.S. Cl. ................................................... 123/192.2
[58] Field of Search .......................... 123/192.2; 74/603, 74/604

[56] References Cited

U.S. PATENT DOCUMENTS 5,044,333  9/1991  Fuchigama et al. ................. 123/192.2
5,156,068  10/1992  Möller ................................. 123/192.2
5,305,656  4/1994  Kamiya et al. ..................... 123/192.2

FOREIGN PATENT DOCUMENTS 58-160644  9/1983  Japan.
62-97031  6/1987  Japan.
4-224338  8/1992  Japan.
4-231752  8/1992  Japan.

*Primary Examiner*—Noah P. Kamen
*Attorney, Agent, or Firm*—Kenyon & Kenyon

[57] ABSTRACT

In a multiple cylinder engine having a plurality of cylinders, balance weights are centrally arranged so as to suppress the secondary vibration in a space corresponding to the second bearing journal counted from the opposite side of the transmission among a plurality of the bearing journals of the crank arms. In addition, the weights can be less light-weight and space efficiency in the engine room will become high.

3 Claims, 10 Drawing Sheets

COMPARISON OF NOISE FILLED IN THE CAR
(NOISE SHUT IN THE CAR) AT THE CENTER
OF THE FRONT SEAT

BALANCER APPARATUS FOR ENGINE

BACKGROUND OF THE INVENTION

1. Field of the Invention

The present invention relates to a balancer apparatus for engine, more particularly, to arrangement of balance weights.

2. Description of the Related Art

In straight 4-cylinder engines, for example, the four cylinders are arranged in line and is constructed that a piston provided in each cylinder is connected to each connecting rod, the connecting rod is also rotatably connected to a crank arm of a crank shaft and the crank shaft is rotatably supported by a plurality of bearings through the crank arm.

In this type of engine, inertial force or inertial couple induced by a piston, a connecting rod, etc. of engine, generates a secondary vibration in the direction (up and down directions) of an axis of the cylinder. This causes noise shut up within a car. To reduce the secondary vibration, a balancer apparatus having balance weights which is rotatably driven together with the crank shafts rotate is provided.

A conventional balancer apparatus, generally, a plurality of balance weights are arranged symmetrically in the front and the rear directions to the engine center. Conventionally, they are arranged in a space corresponding to a bearing journal.

Moreover, other conventional 4-cylinder engines as disclosed in Japanese Patent Laid Open No. 4-224338, balance weights are centrally placed in a space corresponding to the third bearing journal which is the center of five bearing journals of the crank shafts.

It is, however, desirable that the secondary vibration be completely suppressed when a balance rate is set as 100%, as from the point of ideal balancer apparatus. A balance rate is a ratio between a secondary imbalance inertial force and inertial force (centrifugal force) of a balance shaft (balance weight). Further, as from the design of engine, it is desirable that a balancer apparatus be made compact.

In the apparatus disclosed in the above mentioned publication, Japanese Patent Laid-Open No. 4-224338, since the balance weights are placed in a space in the center of the engine where the third bearing journal is located, the balance rate is easily set as 100% and it is easy to make it compact (small-sized).

As from the point of ideal balancer apparatus, when the balance rate is set as 100%, it is desirable to completely suppress the secondary vibration, however, it is necessary under some circumstances even sacrificing the balance rate that it becomes a priority to lower the weight.

Moreover, recently, for improving the engine output, space efficiency in the engine room is aggravated due to the large-sized exhaust pipes, arrangement of catalyst for enforcing an exhaust gas control and introduction of parts for enforcing stiffness of the car body, etc. This, further, causes the arrangement of balancer apparatus difficult as for design consciousness. The apparatus mentioned in the publication 4-224338 is not appropriate for the design purpose.

SUMMARY OF THE INVENTION

It is therefore an object of the present invention to provide a balancer apparatus for an engine which made it possible to compact the balancer apparatus and is high in space efficiency considering the total designing including an arrangement of engine room.

In order to achieve the foregoing object of the invention, a balancer apparatus for multiple cylinder engine is comprised as follows. The engine has a plurality of cylinders; connecting rods are attached to a piston provided in each cylinder; each connecting rod is rotatably attached to a crank arm in a crank shaft and the crank shaft is rotatably supported by a plurality of bearing journals through each crank arm; a transmission is attached to one end of the crank shaft; and the engine generates a secondary vibration to the cylinder in accordance with the reciprocatory movement of the piston. The balancer apparatus suppresses the secondary vibration in the engine by balance weights which are rotatably driven together with a crank shaft rotates, and the balance weights are centrally placed only in a space where a bearing journal counted second from the opposite side of the transmission is located.

The present invention can be applied to engines which generate a secondary vibration. Such engines are a single cylinder engine, a straight 2-cylinder engine, a straight 4-cylinder engine, a V-type 6-cylinder engine, some V-type 8-cylinder engine, etc. It is particularly used for the engine having a second bearing journal. More particularly, it is preferably used for straight 4-cylinder engines.

In such cases, four cylinders are arranged in line in the multiple cylinder engines, each connecting rod is attached to a piston provided in each cylinder and is further attached to a crank arm of the crank shaft, the crank shaft is rotatably supported by a plurality of bearing journals through each crank arm and a transmission is connected to one end of the crank shaft.

By centrally arranging the balance weights, a space is provided in corresponding to a bearing journal in the transmission side, where other parts can be arranged thereto. Further the space is out from the center of the engine, it is possible to suppress the secondary vibration at a less lightweight when compared to the arrangement where the balance weight is located in the center of the engine.

DESCRIPTION OF THE PREFERRED EMBODIMENT

Preferred embodiments of the present invention will now be described with reference to the accompanying drawings.

Figure 1:
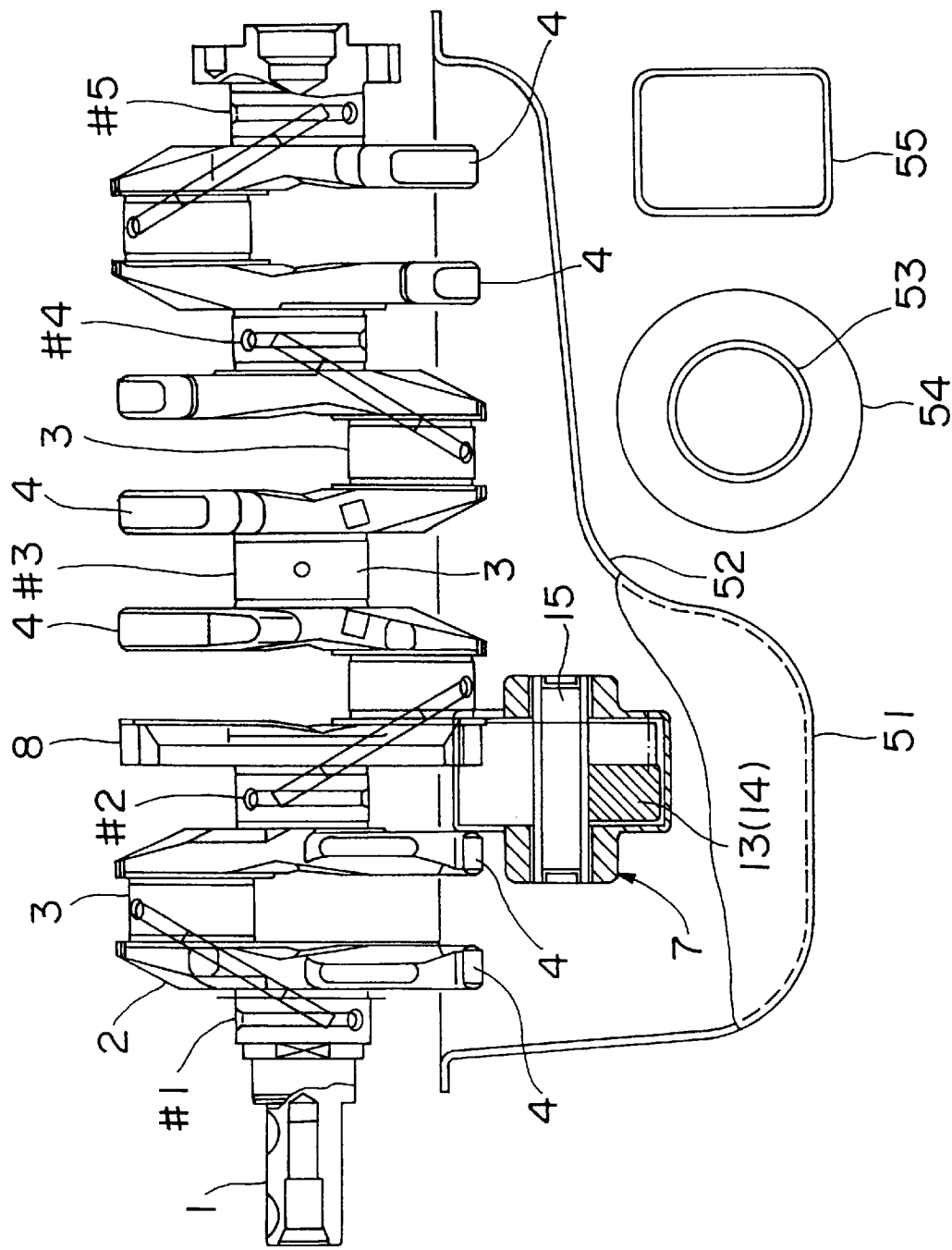
FIG. 1 is a sectional view cut away in cross section, illustrating a crank shaft according to the present invention.

FIG. 1 illustrates a crank shaft of straight 4-cylinder engine which is a so-called transverse-type Front Wheel Drive.

It is well known that in a straight 4-cylinder engine (not shown), four cylinders are arranged in line and each piston provided in each cylinder is attached to a connecting rod. Each connecting rod is attached to a crank arm 2 in a crank shaft 1 and is rotatable around a crank axis 3. The crank axis corresponds to a number of cylinder, that is, there are four in the 4-cylinder engine. The location thereof is called, in reference to FIG. 1 from the left, the first pin journal, the second pin journal, the third pin journal and the fourth pin journal. In addition, the crank arm 2 is provided with a counter weight 4 for suppressing a vibration in the longitudinal direction of the engine (primary vibration) in an opposite side of the crank axis 3.

Further, the crank shaft is rotatably supported by the first to the fifth bearing journals of #1 –#5 facing to the engine body in reference with FIG. 1 from the left. These bearing journals #1 to #5 are called the first journal . . . the fifth journal.

On one end side of the crank shaft, shown in the right side of FIG. 1, is connected to a power train consisting of transmission 6, etc. and a rotational power of the crank shaft 1 is transmitted to a wheel via power train.

In the direction that the cylinders of the engine are arranged, a space lower which corresponds to the second bearing journal (second journal) counted from the opposite side of the transmission is provided with a balancer apparatus 7 which suppresses the secondary vibration of engine by the balance weights which rotatably drive together with the crank shaft rotates.

The balancer apparatus includes a balancer case 9 which forms a housing for the whole apparatus and is provided with a fixation axis 15. The balance weights 13, 14 are eccentric to the center of gravity and are rotatable around the fixation axis. Further, the balance weights 13, 14 are provided in the crank shaft 1 of the second bearing journal #2 and are rotatably driven by the drive gear 8 which rotates together with the rotation of the crank shaft 1 through the driven gears 18, 19. The balance weights 13, 14 correspond to the second bearing journal #2 and are centrally located only in a space which corresponds to the second bearing journal #2 is located. As a result, space can be obtained at other location.

Figure 2:
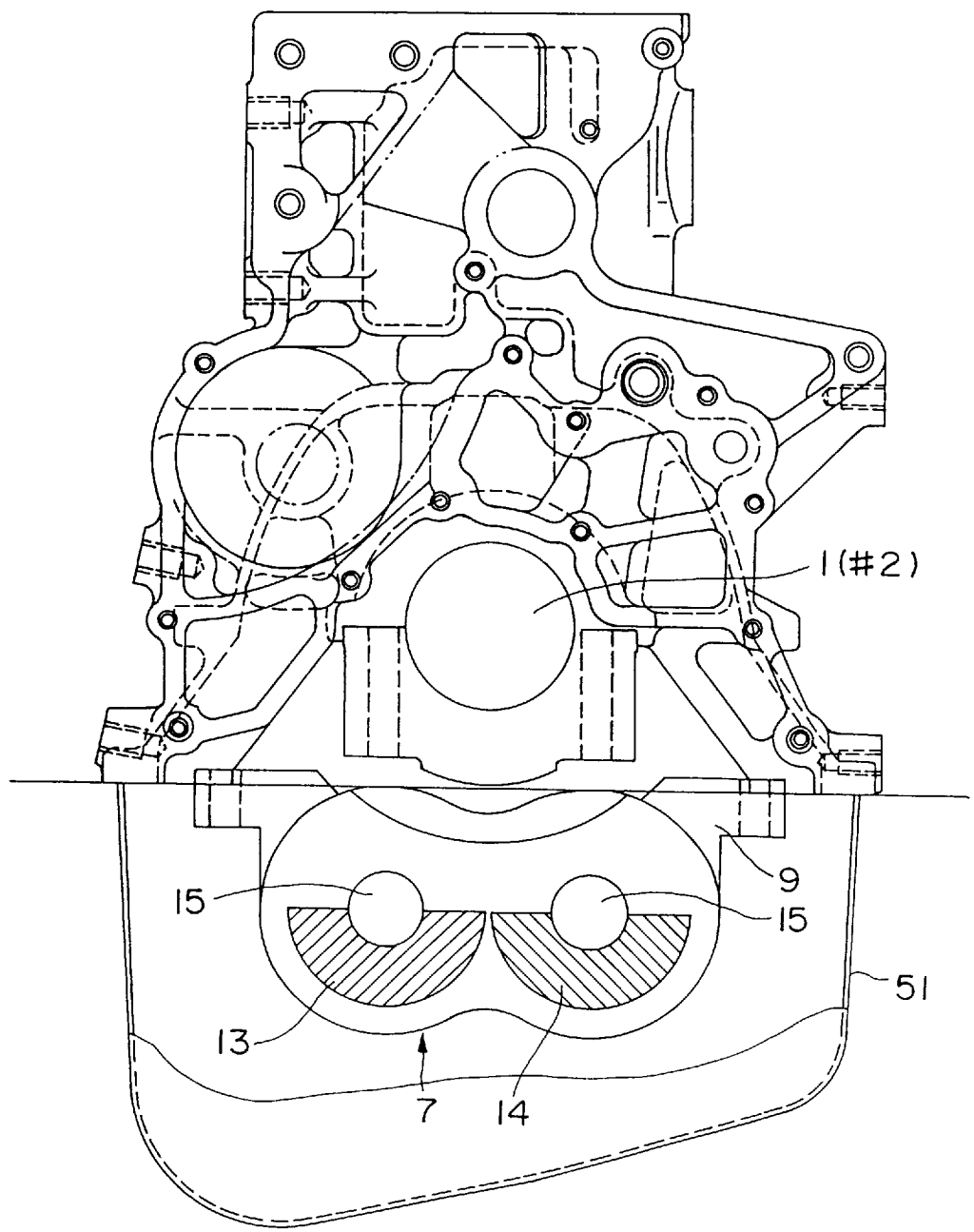
FIG. 2 is a front view cut away in cross section, illustrating a crank shaft according to the present invention.
Figure 3:
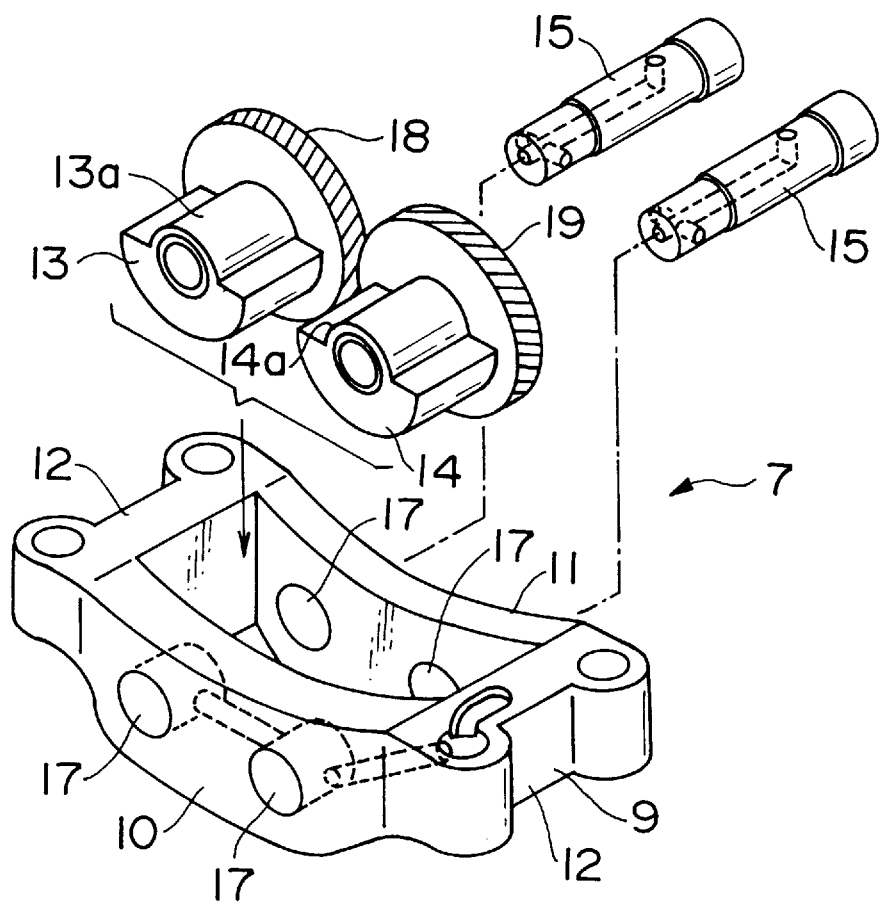
FIG. 3 is a perspective view showing one form of a balancer apparatus.

As is not apparent from FIG. 1 but as shown in FIGS. 2 and 3, the balance weights 13, 14 are provided in pair.

Detailed explanation of the balancer apparatus will now be described. As shown in FIG. 3, the balancer case 9 which is a main body of the balancer apparatus 2 is constructed in a square frame with a pair of support pieces 10, 11 which extend to the longitudinal direction and are parallel each other and with a pair of connection pieces 12 which connect the right and the left end portions of the support pieces 10, 11 opposed each other. The four corners of the balancer case 9 are further fixed to a cylinder block by bolts (not shown).

In addition, in the balancer case 9, balance weights of the first weight 13 and the second weight 14 are rotatably supported by a pair of fixation axes 15. That is, both end portions of each fixation axis 15 are inserted to and engaged with a pair of holes 17 which penetrate to each support pieces 10, 11 and are non-rotatable. Further, the first and the second weights 13, 14 are almost semi-columnar, the center of gravity is eccentric to the fixation axis 15 and are nonrotatably fixed to the fixation axis 15 by means of the bearing journals 13*a*, 14*a*.

The rear portions of the first and the second weights 13, 14 are fixed to the first and the second driven gears 18, 19 in which a diameter thereof are smaller than the drive gear 8. Both the driven gears 18, 19 are rotatable integratedly with the first and the second weights 13, 14 over the fixation axis 15. The driven gears 18, 19 are helical gears like the drive gear 8. They are designed so that the first driven gear 18 has right torsion (right shoulder is up), while the second driven gear 19 has left torsion (left shoulder is up).

Figure 4:
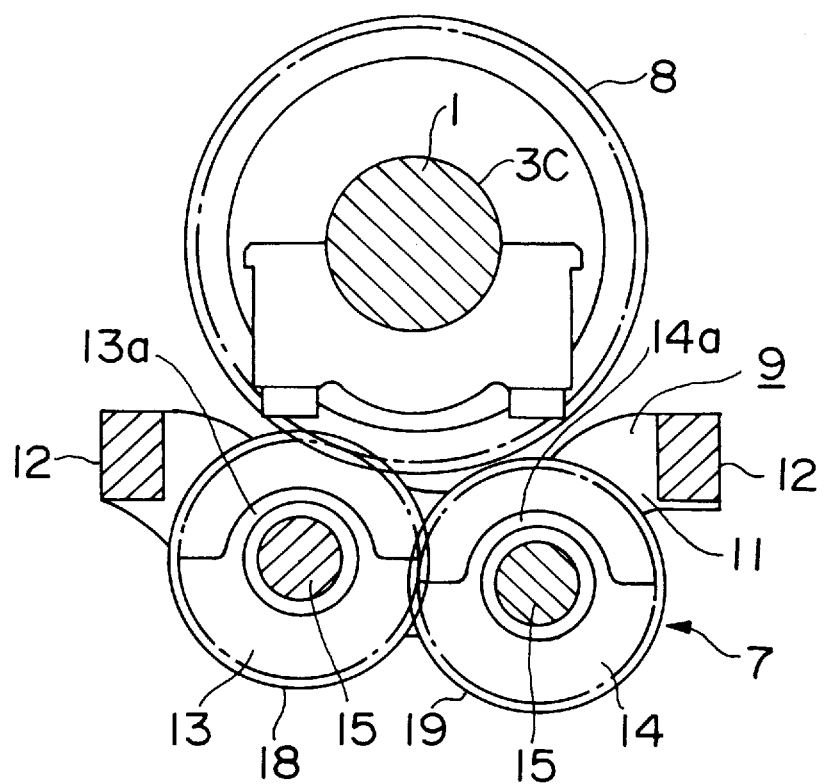
FIG. 4 is showing a drive gear in the balancer apparatus.

Moreover, as shown in FIG. 4, the first driven gear 18 is engaged with the drive gear 8, while the second driven gear 19 is engaged with the drive gear 9. When both gears are engaged as shown in FIG. 1, the first and the second weights 13, 14 are centrally placed within the space of front-to-rear direction length of the engine where the second bearing journal #2 corresponds.

When the drive gear 8 rotates integratedly with the crank shaft 1, the rotation is transmitted to the driven gear 18 to rotate the first weight 13 over the fixation axis 15. Moreover, the rotation of the first driven gear 18 is transmitted to the second driven gear 19 to rotate the second weight 14 over the fixation axis 15. The rotation of the weights 13, 14 generate a load direct such that the inertial force or inertial couple caused by the piston, the connecting rod 7, etc. is canceled. This load reduces vibration of the crank shaft 1.

An oil pan 51 in a container-type for containing engine oil is provided in the lower portion of the engine as in the form of enclosing the balancer apparatus. For this construction, the balancer apparatus is immersed in the oil and is filled with oil consequently. When looking from the outside bottom surface, the oil pan 51 is formed of a recessed portion 52 which enters into a space extending from the fifth to third bearing journals #5–#3. Enable to form such recessed portion 52 is that the balance weights are centrally placed only in the space which corresponds to the second bearing journal #2. As a result, space can be obtained in the other locations. Therefore, space efficiency in the engine room becomes high, more concretely, it is possible to place without difficulty a center member 55 for body enforcement and an exhaust pipe 55 and a catalyst 54 for an exhaust device in the lower position of engine which is the outside of the recessed portion 52.

Figure 5:
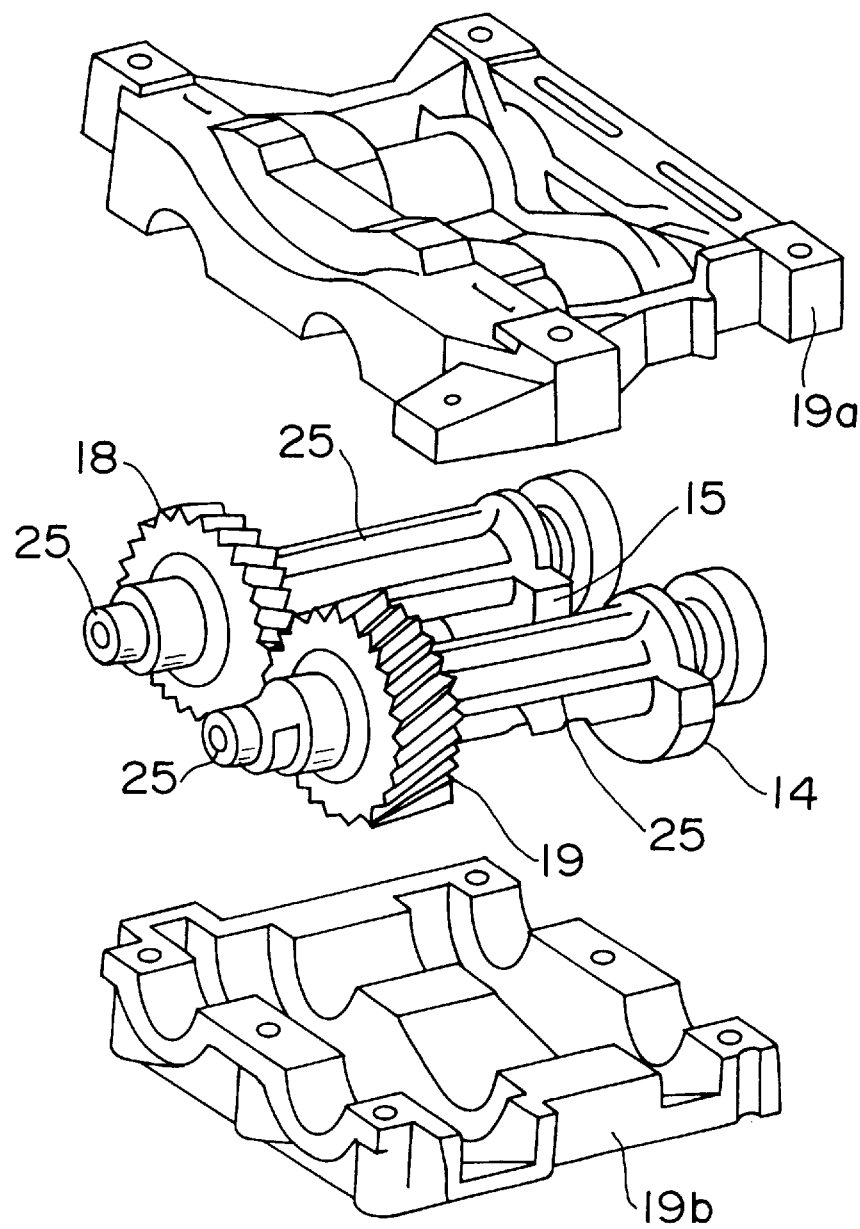
FIG. 5 is showing other example of a balancer apparatus.

In FIG. 3, the fixation axis is fixed to the balancer case 9, and the balance weights are rotatably provided around the fixation axis. However, as shown in FIG. 5, the balance shaft 25 in place of the fixation axis may be provided in the balancer cases 19*a*, 19*b*. The balance weights 14, 15 may be fixed to the balance shaft 25 which is rotatable.

Moreover, the balance weights 14, 15 are rotatably driven by the drive gear 8 in the above embodiment, however, when the drive gear 8 is omitted, a balance shaft may be rotatably driven by a chain or a timing belt driven by the crank shaft from an engine front, that is, in the left side of FIG. 1. In such case, it is necessary to extend the balance shaft which rotatably drives the balance weights to the engine front side. According to the present invention, since the balance weights are centrally placed near the engine front side corresponding to the second bearing journal, the extension to the balance shaft to the engine front side can be made it shorter.

(Suppression of secondary vibration)

Effects of suppression of the secondary vibration by centrally placed the balance weights to the second bearing journal will be discussed.

FIGS. 6 to 10 are rough illustration of an engine. What degree that the secondary vibration can be suppressed is known by the strength of the secondary inertial force inputting to the right and the left engine mounts. It means that the smaller the secondary inertial force inputted to the mounts is, the secondary vibration is suppressed.

Moreover, Rh mount and LH mount shown in FIGS. 6–10 are mounts that the right and the left are determined by in reference with the traveling direction of vehicles, but they are not showing the right and the left in the drawings.
(Comparative Example 1—without the balancer apparatus)

In the following specification of engine in which no balancer apparatus is utilized. How does the secondary vibration change is calculated (refer to FIG. 6).

r: radius of crank rotation (45.5 mm)

l : length of connecting rod (138 mm)

p: r/l (0.33)

m: weight of reciprocating momentum (682 g)

F: secondary imbalanced inertial force generated at 6000 rpm

FR: secondary inertial force to be inputted to Rh mount

FL: secondary inertial force to be inputted to Lh mount
When $$F=mr\omega^2\rho\times 4, \text{ wherein } \omega=2\pi f=2\pi\times 6000/60, \text{ thus } F=16172\ (N) \quad (1)$$

According to power balance, $$F=FR+FL \quad (2)$$

According to moment balance $$(328.5+122.5)FR-122.5F=423.5FL \quad (3)$$

From (1),(2),(3)

$$FR=10097(N), FL=6075(N) \quad (4)$$

This means that the large secondary vibration is inputted to the left and right engine mounts. That is, this means that the secondary vibration of the engine is not suppressed.
(Embodiment 1)—With 82% of balancer apparatus The same engine as in the Comparative Example 1 is used. The suppression effect of the secondary vibration is calculated when the balance weights (balance rate of 82%) are centrally arranged in the lower portion of the second bearing journal (refer to FIG. 7).

When FB is a centrifugal force by balance weight, $$FB=0.82F \quad (5)$$

According to power balance, $$F-FB=FR+FL \quad (6)$$

According to moment balance, $$(328.5+122.5)FR+122.5FB-122.5F=423.5FL \quad (7)$$

From (5), (6), (7)

$$FR=1817(N), FL=1094(N) \quad (8)$$

(Comparative Example 2)—a balancer apparatus with balance rate of 100% is arranged in the lower portion of the third bearing journal.

In this example, the specification of engine is r: radius of crank rotation (51 mm)

l: length of connecting rod (158 mm)

ρ: r/l (0.32)

m: weight of reciprocating momentum (530 g)

F: secondary imbalanced inertial force generated at 6000 rpm

FR: secondary inertial force to be inputted to Rh mount

FL: secondary inertial force to be inputted to Lh mount

Figure 8:
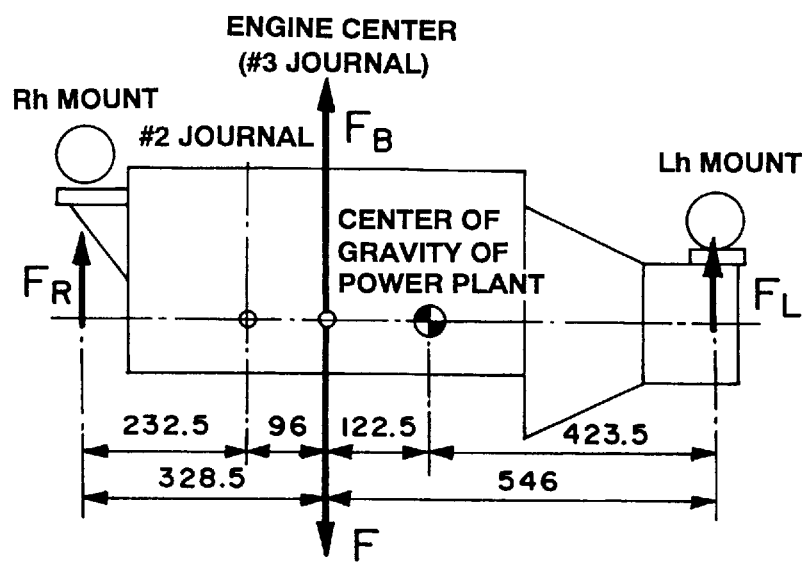
FIG. 8 is a conceptual diagram for calculating the comparative example 2.

The suppression of the secondary vibration is calculated when the balance weights with 100% balance rate is centrally arranged in the lower portion of the third bearing journal (refer to FIG. 8).

$$F=m e\omega^2\rho\times 4, \text{ wherein } \omega=2\pi f=2\pi\times 6000/60, \text{ thus } F=13658(N) \quad (9)$$

Since the balance rate is 100%, $$F=FB \quad (10)$$

(FB is a centrifugal force by balance weight)
According to power balance, $$F-FB=FR+FL \quad (11)$$

According to moment balance, $$(328.5+122.5)FR+122.5FB-122.5F=423.5FL \quad (12)$$

From (9),(10),(11),(12)

$$FR=0(N), FL=0(N) \quad (13)$$

(Embodiment 2)—A balancer apparatus of balance rate of 100% is arranged in the lower portion of the second bearing journal.

The same engine used in the comparative example 2 is used. The suppression of the secondary vibration is calculated when the balance weights with 100% of balance rate are centrally arranged in the lower portion of the second bearing journal (refer to FIG. 9).

Here, since the balance rate is 100%, $$F=FB \quad (14)$$

According to power balance, $$F-FB=FR+FL \quad (15)$$

According to moment balance, $$(328.5+122.5)FR+(122.5+96)FB-122.5\ F=423.5FL \quad (16)$$

From (14),(15),(16)

$$FR=1500(N), FL=1500(N) \quad (17)$$

(Embodiment 3)–α% (less than 100%) balancer apparatus in the lower portion of the second bearing journal.

The same engine as in the comparative example 2 is used. The suppression of the secondary vibration is calculated when balance weights of 60% (less than 100%) are centrally arranged in the lower portion of the second bearing journal (refer to FIG. 10).

Since the balance rate is 60%, $$FB=0.1\alpha F \quad (18)$$

According to power balance $$F-FB=FR+FL \quad (19)$$

According to moment balance, $$(328.5+122.5)FR+(122.5+96)FB-122.5f=423.5FL \quad (20)$$

From (18),(19),(20)

$$FR=8527.5-100.3\alpha(N) \ FL=5130.5-36.3\alpha(N) \quad (21)$$

Figure 11:
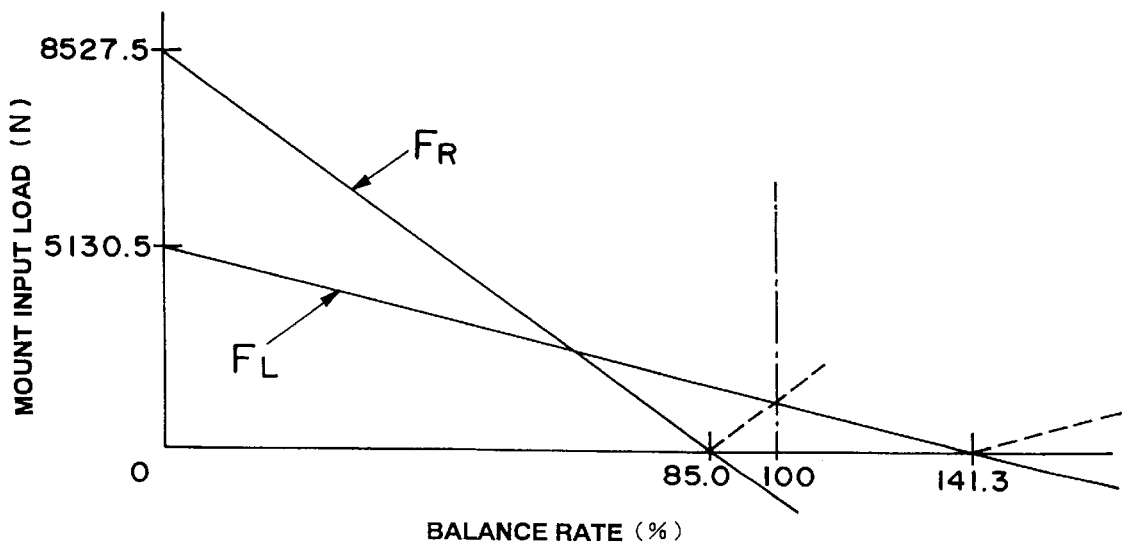
FIG. 11 is a graph showing a relation between the balance rate and a mount input load according to the embodiment 3.

When this is illustrated in a graph, this becomes FIG. 11. FIG. 11 shows that the Rh mount input becomes 0(N) when the balance rate is 85.0% and the LH mount input becomes 0(N) when the balance rate is 141.3%.

When considering the lightweight of the balancer apparatus, friction, input load in total of RH mount and LH mount, and arranging the balance weight in the lower portion of the second bearing journal, the balance rate of 85.0% shows the best result.

Further, at this time, $$FR=0(N), FL2045(N) \quad (22)$$

Moreover, the noise filled in the car reflects a resultant force of absolute values of FL and FR.

$$F=|FR|+|FL| \quad (23)$$

$$FR=8527.5-100.3\alpha(N)$$

$$FL=5130.5-36.3\ \alpha(N)$$

In each expression of the above, a is changed from 60 to 115 successively, balance values of |FR|, |FL|, and |FR|+|FL| are obtained in the following Table 1.

TABLE 1

| Balance | \| FR \| | \| FL \| | \|FR\| + \|FL\| |
|---|---|---|---|
| 60% | $2510_N$ | $2953_N$ | $5463^N$ |
| 70 | 1507 | 2590 | 4097 |
| 75 | 1005 | 2408 | 3413 |
| 78 | 704 | 2299 | 3003 |
| 79 | 604 | 2263 | 2867 |
| 80 | 504 | 2227 | 2731 |
| 85 | 0 | 2045 | 2045 |
| 90 | 500 | 1864 | 2364 |
| 95 | 1001 | 1682 | 2683 |
| 97 | 1202 | 1609 | 2811 |
| 98 | 1302 | 1573 | 2875 |
| 99 | 1402 | 1537 | 2939 |
| 100 | 1500 | 1500 | 3000 |
| 105 | 2004 | 1319 | 3323 |
| 110 | 2506 | 1138 | 3644 |
| 115 | 3007 | 956 | 3963 |

As from the above, when considering the noise filled in the car, it is understood that according to the present invention, when the balance rate is 85%, good results are obtained.

Figure 12:
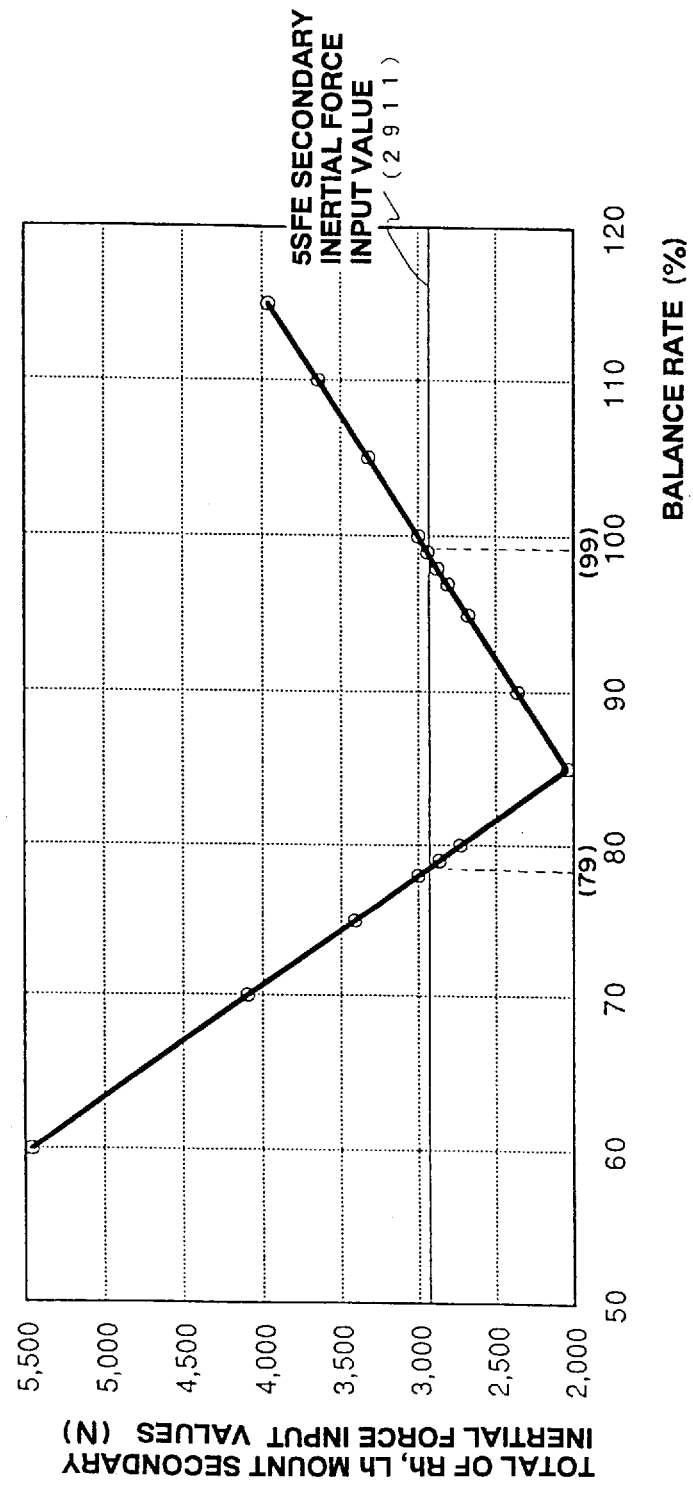
FIG. 12 is a graph showing a relation between the balance rate and mount input values according to the embodiment 3.

FIG. 12 is a graph showing a relation between a balance rate and the total input values of the secondary inertial force in each mount.

In this graph, it is understood that the noise filled in the car (refer to A in FIG. 13) be set as the same level as Model 5S-FE manufactured by TOYOTA JIDOSHA KABUSHIKI KAISHA (5S-FE engine described in the manual of new model cars TOYOTA SCEPTER published in November 1992), the balance rate may be kept at 79–99%.

Within the above extent, the noise within a car can be kept as in the practical sound level as in a room. A noise in the car is not necessarily set as 0 dB but may be allowed within a certain extent that a crew such as driver does not feel.

COMPARISON BETWEEN THE EMBODIMENTS AND THE COMPARATIVE EXAMPLES (Comparison between the embodiment 1 and the comparative example 1)

According to the expressions (4) and (8), when the difference in size of the secondary inertial force inputted to the RH mount is expressed by dB, $$L = 20\ \log_{10}\{FR\ (\text{no balancer apparatus})\ /\ FR\ (\text{with balancer appartus})\}$$
$$= 20\ \log_{10}\ \{10097/1817\}$$
$$= 14.9\ (\text{dB})$$

This value is close to the difference of vibration level (with and without the balancer apparatus) at the root of the RH mount of model 5SFE manufactured by TOYOTA JIDOSHA KABUSHIKI KAISHA.

Figure 13:
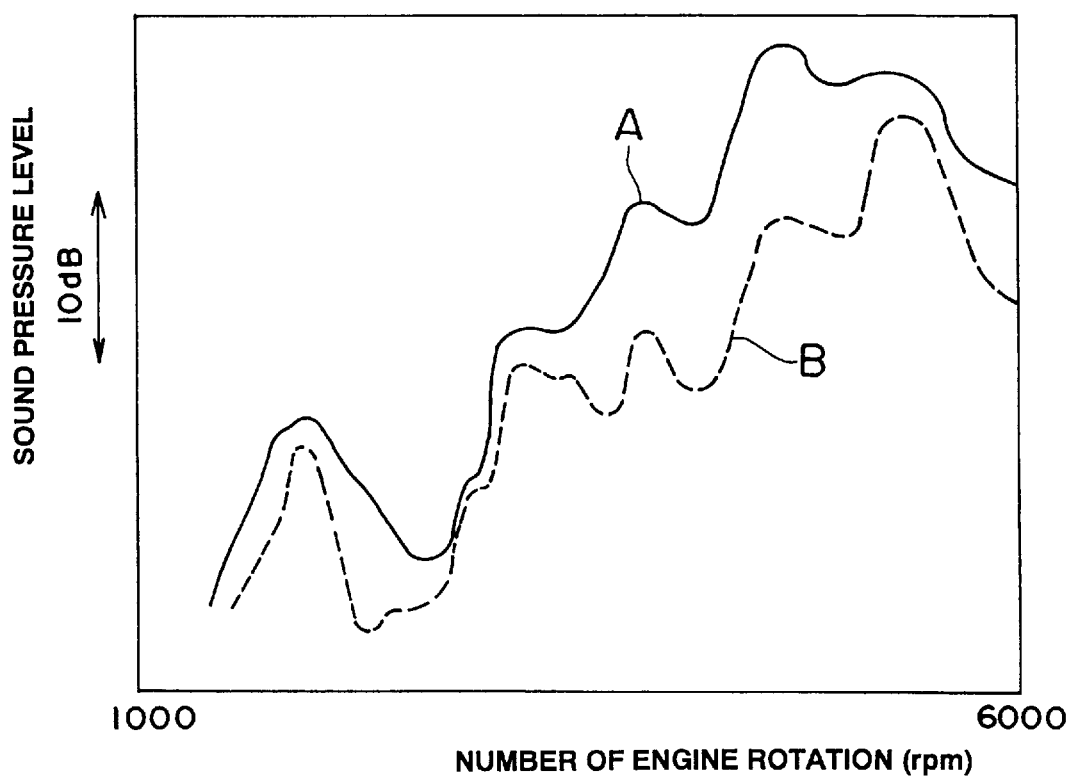
FIG. 13 is a graph showing loudness of noise shut within a car in relation with the number of rotation of engine.

In this connection, the difference of the noise filled within the car (the noise shut in the center of the front seat) in the engine model 5SFE with and without the balancer apparatus is shown in FIG. 13. In FIG. 13, A shows without a balancer apparatus and B shows with a balancer apparatus (balance rate of 82%). The difference is 10 dB at maximum. The difference of the resultant force of the secondary inertial force input value is 16172 (N)–2911 (N)=13261 (N). A reduction of almost 1300 (N) of mount input value is an effect of reducing 1 dB of noise shut within the car. As a result, the maximum is 10 dB.

(Comparison between the embodiment 3 and the embodiment 1 and the comparative example 1)

A relation among |FR|, FL| and FR|+|FL| in terms of balance value is calculated for the embodiment 1 and the comparative example 1 and then is compared with the embodiment 3.

In the embodiment 1 (with 82% balancer apparatus), $$|FR|: 1817\ (N),\ |FL|: 1094\ (N)\ |FR|+|FL|: 2911\ (N)$$

In the comparative example 1 (without balancer apparatus), $|FR|: 10097\ (N), |FL|: 6075\ (N)$
$|FR|+|FL|: 16172\ (N)$ As from the above, the difference between mount input values 16172 (N) and 2911 (N) in referring to the noise filled in the car is 10 dB at maximum.

(Comparison between the comparative example 2 and the embodiment 2)

According to the expression 12 of the comparative example, the moment balance is $$(328.5+122.5)FR+122.5FB-122.5F=423.5FL$$

As compared, the moment balance in the embodiment 2 is in the expression 16, $$(328.5+122.5)FR+(122.5+96)FB-122.5F=423.5FL$$

When paying attention to the second term in each expression, in the comparative example, it is 2122.5FB, while (122.5+96)FB in the embodiment 2. This means that in the second bearing journal, FB: the centrifugal force by the balance weights is smaller when comparing with the third bearing journal.

It is well known than the size of a centrifugal force is proportion to the size of mass of an object.

It means that the FB may be small is that the mass of the balance weight can be made small.

Therefore, when the balance weights are arranged in the lower location of the second bearing journal, the balance weights can be made light. This also reduces friction in the balancer apparatus.

A friction moment M at a fluid lubricating bearing is expressed as follows:

$$M = 2\pi \cdot (\eta VR^2 L/C). \quad \text{Since } V = R\omega$$
$$= 2\pi \cdot (\eta VR^3 L/C) \; (\propto R^3) \quad (24)$$

C: radius of clearance between a balance weight and a balancer case

R: radius of balance weight axis

L: width of balance weight bearing

V: circumferential speed of balance weight $\eta$: coefficient of kinematic viscosity $\omega$: velocity of balance weight angle The friction moment is proportion to the cube of a diameter of bearing or width of the bearing and is inversely proportion to a clearance.

When a mass of the balance weight is made light, the centrifugal force becomes small and the clearance C can be made small.

Further, a surface pressure at bearing $=mr\omega^2/2RL$, as m (mass) is smaller, RL can be made small.

As a result, in the expression 23, C can be made big and RL can be made small. Thus, the friction moment can be made small.

What is claimed is:

1. A balancer apparatus for a multiple cylinder engine wherein the engine has a plurality of cylinders comprising:

connecting rods attached to a piston provided in each cylinder, wherein each connecting rod being rotatably attached to a crank arm in a crank shaft and the crank shaft being rotatably supported by a plurality of bearing journals through each crank arm; and a transmission attached to one end of the crank shaft, said engine generates a secondary vibration to the cylinder in accordance with a reciprocatory movement of the piston, wherein the balancer apparatus suppresses the secondary vibration in the engine by balance weights which are rotatably driven together when the crank shaft rotates and, the balance weights are centrally placed in a first space corresponding to a bearing journal located second from an opposite side of where the transmission is located, wherein the multiple cylinder engine is at least a straight 4-cylinder engine.

2. The balancer apparatus for an engine according to claim 1, wherein a second space is provided between the transmission side and said first space, and wherein bearing journals are located.

3. The balancer for an engine according to claim 2, further comprises an oil pan for containing oil, said oil pan enclosing the balancer apparatus and being provided in a lower portion of the engine and in a recessed portion, said recessed portion incorporating said second space.

* * * * *

UNITED STATES PATENT AND TRADEMARK OFFICE
CERTIFICATE OF CORRECTION

PATENT NO. : 5,875,753
DATED : March 2, 1999
INVENTOR(S) : Makoto Ishikawa

It is certified that error appears in the above-identified patent and that said Letters Patent is hereby corrected as shown below:

Delete columns 1-10 of the specification and substitute therefore columns 1-10 as shown on the attached pages.

Signed and Sealed this

Fifth Day of February, 2002

Attest:

JAMES E. ROGAN
Director of the United States Patent and Trademark Office

*Attesting Officer*

United States Patent
Ishikawa

[11] Patent Number: 5,875,753
[45] Date of Patent: Mar. 02, 1999

[54] BALANCER APPARATUS FOR ENGINE

[75] Inventor: Makoto Ishikawa, Mishima, Japan

[73] Assignee: Toyota Jidosha Kabushiki Kaisha, Toyota, Japan

[21] Appl. No.: 08/938,624

[22] Filed: Sep. 26, 1997

[30] Foreign Application Priority Data

Dec. 27, 1996 [JP] Japan .................................. 8-351127
Feb. 7, 1997 [JP] Japan .................................. 9-025583

[51] Int. Cl.⁶ .................................. F01L 7/00
[52] U.S. Cl. .................................. 123/192.2
[58] Field of Search .................. 123/192.2; 74/603, 74/604

[56] References Cited

U.S. PATENT DOCUMENTS 5,044,333  9/1991  Fuchigama et al. .................. 123/192.2
5,156,068  10/1992  Möller .................................. 123/192.2
5,305,656  4/1994  Kamiya et al. ...................... 123/192.2

FOREIGN PATENT DOCUMENTS 58-160644  9/1983  Japan .
62-97031   6/1987  Japan .
4-224338   8/1992  Japan .
4-231752   8/1992  Japan .

*Primary Examiner*—Noah P. Kamen
*Attorney, Agent, or Firm*—Kenyon & Kenyon

[57] ABSTRACT

In a multiple cylinder engine having a plurality of cylinders, balance weights are centrally arranged so as to suppress the secondary vibration in a space corresponding to the second bearing journal counted from the opposite side of the transmission among a plurality of the bearing journals of the crank arms. In addition, the weights can be less light-weight and space efficiency in the engine room will become high.

4 Claims, 10 Drawing Sheets

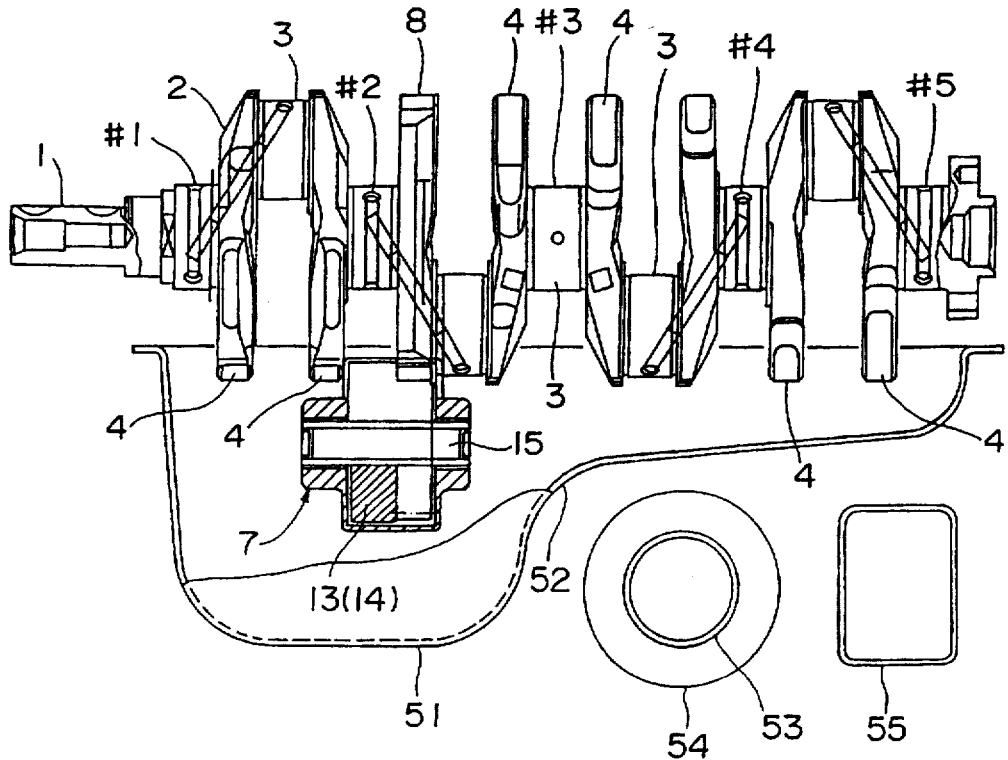

BALANCER APPARATUS FOR ENGINE

BACKGROUND OF THE INVENTION

1. Field of the Invention

The present invention relates to a balancer apparatus for an engine, and more particularly, to an arrangement of balanced weights for an engine.

2. Description of the Related Art

In 4-cylinder engines, for example, the four cylinders are arranged in a line and a piston is provided in each cylinder. Each piston is connected to a connecting rod, wherein the connecting rod is rotatably connected to a crank arm of a crank shaft. The crank shaft is rotatably supported by a plurality of bearings through the crank arm.

In this type of engine, inertial force or inertial couple induced by a piston, a connecting rod, etc. of an engine, generates a secondary vibration in the direction (upward and downward directions) of an axis of the cylinder. This causes noise within a car. To reduce the secondary vibration, a balancer apparatus having balance weights which are rotatably driven together with the crank shaft rotation is provided.

A conventional balancing apparatus, generally a plurality of balance weights, are arranged symmetrically to the front and the rear of the engine center. Conventionally, they are arranged in a space corresponding to a bearing journal.

In other conventional 4-cylinder engines, as disclosed in Japanese Patent Laid Open Application No. 4-224338, balance weights are centrally placed in a space corresponding to the third bearing journal which is the center of five bearing journals of the crank shaft.

It is desirable that the secondary vibration be completely suppressed when a balance rate is set as 100%. A balance rate is a ratio between a secondary imbalance inertial force and inertial force (centrifugal force) of a balance shaft (balance weight). Further, in the design of an engine, it is desirable that a balancer apparatus be compact.

In the apparatus disclosed in the above mentioned publication, Japanese Patent Application Laid-Open No. 4-224338, since the balance weights are placed in a space in the center of the engine where the third bearing journal is located, the balance rate is easily set as 100% and it is easy to make it compact.

When the balance rate is set as 100%, it is desirable to completely suppress the secondary vibration. It is necessary under some circumstances to sacrifice the balance rate in order to lower the weight.

Space efficiency in the engine area is aggravated due to large-sized exhaust pipes, arrangement of a catalyst for enforcing exhaust gas control and introduction of parts for enforcing stiffness of the car body, etc. This causes further design difficulties for the arrangement of a balancer apparatus. The apparatus mentioned in Japanese 4-224338 is not appropriate for design purposes.

SUMMARY OF THE INVENTION

It is an object of the present invention to provide a balancer apparatus for an engine which is compact in size.

A balancer apparatus for a multiple cylinder engine comprises:
  an engine with a plurality of cylinders;
  connecting rods attached to a piston in each cylinder;
  each connecting rod rotatably attached to a crank arm in a crank shaft and the crank shaft is rotatably supported by a plurality of bearing journals through each crank arm;
  a transmission attached to one end of the crank shaft; wherein an engine generates a secondary vibration to the cylinder in accordance with the reciprocatory movement of the piston.

The balancer apparatus suppresses the secondary vibration in the engine by balance weights which are rotatably driven as a crank shaft rotates.

The balance weights are centrally placed only in a space where a bearing journal counted second from the opposite side of the transmission is located.

The present invention can be applied to engines which generate a secondary vibration. Such engines include a single cylinder engine, a straight 2-cylinder engine, a straight 4-cylinder engine, a V-type 6-cylinder engine, some V-type 8-cylinder engines, etc. It is particularly useful in engines having a second bearing journal.

More particularly, it is preferably used for straight 4-cylinder engines wherein four cylinders are arranged in a line in the multiple cylinder engines; each connecting rod is attached to a piston provided in each cylinder and is further attached to a crank arm of the crank shaft; the crank shaft is rotatably supported by a plurality of bearing journals through each crank arm; and a transmission is connected to one end of the crank shaft.

By centrally arranging the balance weights, a space corresponding to a bearing journal on the transmission side is provided, where other parts can be arranged. The space is not at the center of the engine, making it possible to suppress the secondary vibration at a lighter weight, compared to the arrangement where the balance weight is located in the center of the engine.

BRIEF DESCRIPTION OF THE DRAWINGS

Figure 6:
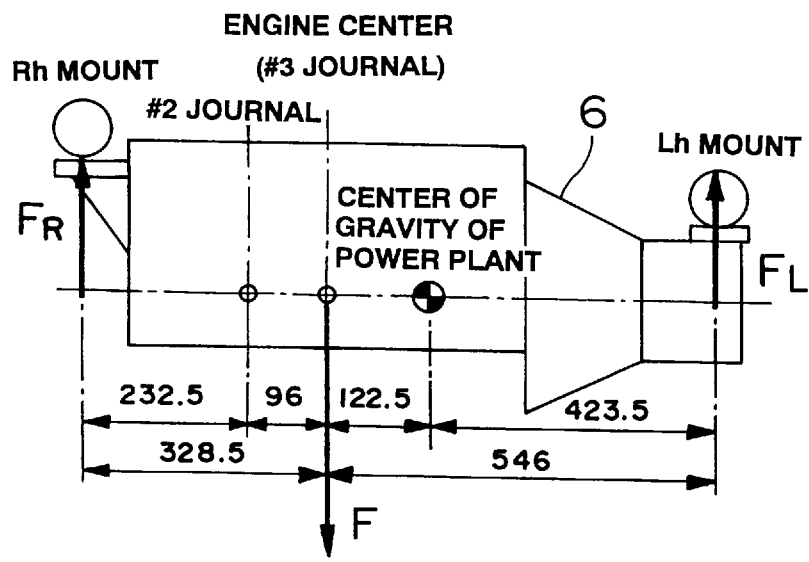
FIG. 6 is a conceptual diagram for calculating the comparative example 1.
Figure 7:
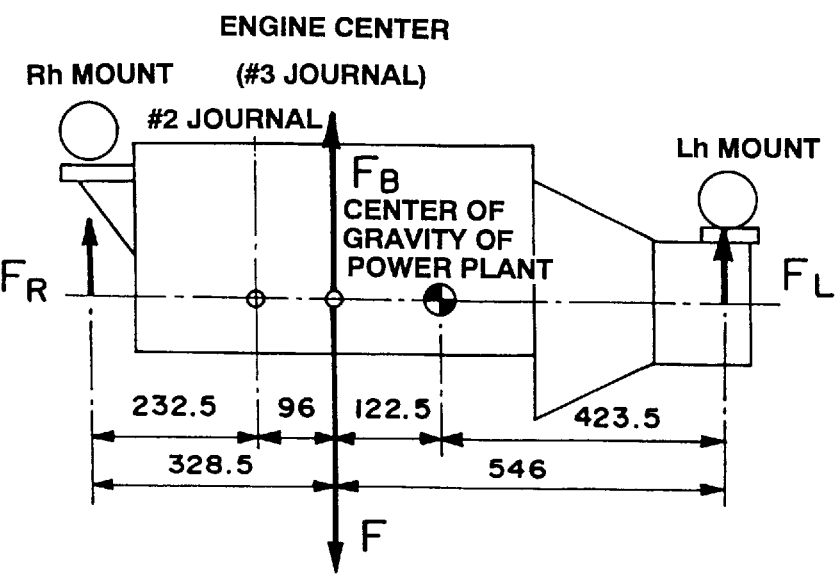
FIG. 7 is a conceptual diagram for calculating the embodiment 1.
Figure 9:
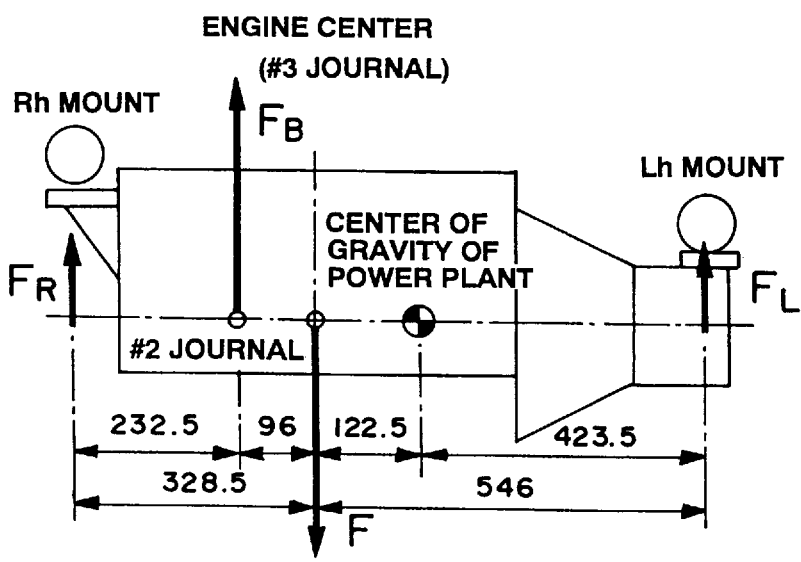
FIG. 9 is a conceptual diagram for calculating the embodiment 2.
Figure 10:
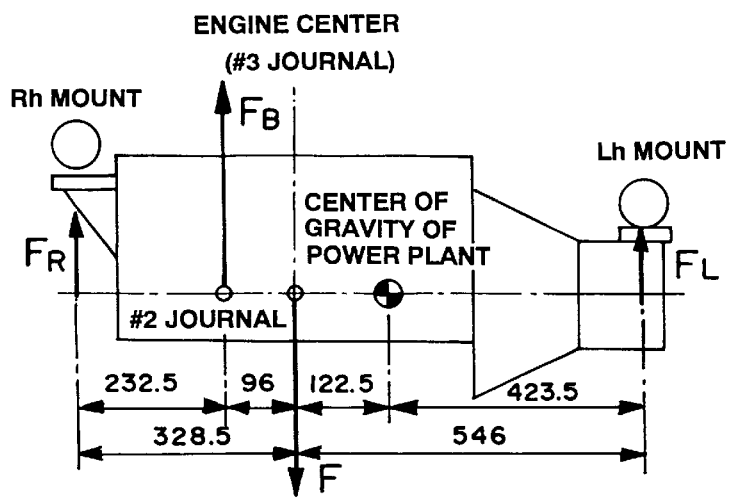
FIG. 10 is a conceptual diagram for calculating the embodiment 3.

FIG. 1 is a sectional view cut away in cross section, illustrating a crank shaft according to the present invention;

FIG. 2 is a front view cut away in cross section, illustrating a crank shaft according to the present invention;

FIG. 3 is a perspective view showing one form of a balancer apparatus;

FIG. 4 is a drive gear in the balancer apparatus;

FIG. 5 is another example of a balancer apparatus;

FIG. 6 is a conceptual diagram for calculating the comparative example 1;

FIG. 7 is a conceptual diagram for calculating the embodiment 1;

FIG. 8 is a conceptual diagram for calculating the comparative example 2;

FIG. 9 is a conceptual diagram for calculating the embodiment 2;

FIG. 10 is a conceptual diagram for calculating the embodiment 3;

FIG. 11 is a graph showing a relation between the balance rate and a mount input load according to the embodiment 3;

FIG. 12 is a graph showing a relation between the balance rate and mount input values according to the embodiment 3; and FIG. 13 is a graph showing loudness of noise within a car relative to the number of rotations of an engine.

DETAILED DESCRIPTION

In a preferred embodiment of the present invention, FIG. 1 illustrates a crank shaft of a straight 4-cylinder engine which is a so-called transverse-type front wheel drive.

It is well known that in a straight 4-cylinder engine (not shown), four cylinders are arranged in a line and each piston provided in each cylinder is attached to a connecting rod. Each connecting rod is attached to a crank arm 2 in a crank shaft 1 and is rotatable around a crank axis 3. The number of crank axes corresponds to the number of cylinders, i.e., there are four crank axes in a 4-cylinder engine. In FIG. 1, reading from the left, the location of the crank axes is called the first pin journal, the second pin journal, the third pin journal and the fourth pin journal. The crank arm 2 is provided with a counter weight 4 for suppressing vibration in the longitudinal direction of the engine (primary vibration) opposite the crank axis 3.

As shown on the left side of FIG. 1, the crank shaft is rotatably supported by the first to the fifth bearing journals of #1–#5 facing the engine body. The bearing journals #1 to #5 are called the first journal through the the fifth journal. As shown on the right side of FIG. 1, one end of the crank shaft is connected to a power train consisting of transmission 6, etc. and a rotational power of the crank shaft 1 is transmitted to a wheel via power train.

In the direction that the cylinders of the engine are arranged, a space lower which corresponds to the second bearing journal (second journal) counted from the opposite side of the transmission is provided with a balancer apparatus 7 which suppresses the secondary vibration of engine by the balance weights which rotatably drive together with the crank shaft rotates.

The balancer apparatus includes a balancer case 9 which forms a housing for the whole apparatus and is provided with a fixation axis 15. The balance weights 13, 14 are eccentric to the center of gravity and are 15 rotatable around the fixation axis. Further, the balance weights 13, 14 are provided in the crank shaft 1 of the second bearing journal #2 and are rotatably driven by the drive gear 8 which rotates together with the rotation of the crank shaft 1 through the driven 20 gears 18, 19. The balance weights 13, 14 correspond to the second bearing journal #2 and are centrally located only in a space which corresponds to the location of the second bearing journal #2. As a result, space is available at other locations.

As is not apparent from FIG. 1 but as shown in FIGS. 2 and 3, the balance weights 13, 14 are provided in a pair.

As shown in FIG. 3, the balancer case 9 which is a main body of the balancer apparatus 2 comprises a square frame; a pair of support pieces 10, 11 which extend longitudinally and are parallel each other; and a pair of connection pieces 12 which connect the right and the left end portions of the support pieces 10, 11. The four corners of the balancer case 9 are further fixed to a cylinder block by bolts (not shown).

In the balancer case 9, balance weights of the first weight 13 and the second weight 14 are rotatably supported by a pair of fixation axes 15. Both end portions of each fixation axis 15 are inserted into and engaged with a pair of holes 17 which penetrate to support pieces 10, 11 and are non-rotatable. The first and the second weights 13, 14 are almost semi-columnar, and are nonrotatably fixed to the fixation axis 15 by means of the bearing journals 13a, 14a. The center of gravity is eccentric to the fixation axis 15.

The rear portions of the first and the second weights 13, 14 are fixed to the first and the second driven gears 18, 19 which have a diameter smaller than drive gear 8. Both driven gears 18, 19 are rotatable integratedly with the first and the second weights 13, 14 over the fixation axis 15. The driven gears 18, 19 are helical gears like the drive gear 8. They are designed so that the first driven gear 18 has right torsion (right shoulder is up), while the second driven gear 19 has left torsion (left shoulder is up).

Moreover, as shown in FIG. 4, the first driven gear 18 is engaged with the drive gear 8, while the second driven gear 19 is engaged with the drive gear 9. When both gears are engaged as shown in FIG. 1, the first and the second weights 13, 14 are centrally placed within the space of front-to-rear direction length of the engine where the second bearing journal #2 corresponds.

When the drive gear 8 rotates integratedlly with the crank shaft 1, the rotation is transmitted to the driven gear 18 to rotate the first weight 13 over the fixation axis 15. Moreover, the rotation of the first driven gear 18 is transmitted to the second driven gear 19 to rotate the second weight 14 over the fixation axis 15. The rotation of the weights 13, 14 generate a load direct such that the inertial force or inertial couple caused by the piston, the connecting rod 7, etc. is canceled. This load reduces vibration of the crank 5 shaft 1.

An oil pan 51 in a container-type for containing engine oil is provided in the lower portion of the engine as in the form of enclosing the balancer apparatus. For this construction, the balancer 10 apparatus is immersed in the oil and is filled with oil consequently. When looking from the outside bottom surface, the oil pan 51 is formed of a recessed portion 52 which enters into a space extending from the fifth to third bearing journals #5–#3. Enabling the formation of such recessed portion 52 is the design whereby the balance weights are centrally placed only in the space corresponding to the second bearing journal #2. As a result, space is available in the other locations and it is possible to place a center member 55 for body enforcement, an exhaust pipe 55 and a catalyst 54 for an exhaust device in the lower position of the engine which is outside the recessed portion 52.

In FIG. 3, the fixation axis is fixed to the balancer case 9, and the balance weights are rotatably provided around the fixation axis. As shown in FIG. 5, the balance shaft 25 in place of the fixation 5 axis may be provided in the balancer cases 19a, 19b. The balance weights 14, 15 may be fixed to the balance shaft 25 which is rotatable.

The balance weights 14, 15 are rotatably driven by the drive gear 8 in the above embodiment. When the drive gear 8 is omitted, a balance shaft may be rotatably driven by a chain or a timing belt driven by the crank shaft from an engine front, that is, in the left side of FIG. 1. In such cases, it is necessary to extend the balance shaft which rotatably drives the balance weights to the engine front side. According to the present invention, since the balance weights are centrally placed near the engine front side corresponding to the second bearing journal, the extension of the balance shaft to the engine front side can be made it shorter.

FIGS. 6 to 10 are a rough illustration of an engine. The degree to which the secondary vibration can be suppressed is determined by the strength of the secondary inertial force inputting to the right and the left engine mounts. The smaller the amount of secondary inertial force inputted to the engine mounts, the less secondary vibration occurs.

Moreover, Rh mount and Lh mount shown in FIGS. 6–10 are mounts that the right and the left are determined by in reference to the traveling direction of vehicles. (The drawing does not show the right and left.)

EXAMPLES

Comparative Example 1A

Without the Balancer Apparatus

The following illustrates the change in secondary vibration in an engine not utilizing a balancer apparatus. (see FIG. 6).

r: radius of crank rotation (45.5 mm)
l: length of connecting rod (138 mm)
p: r/l (0.33)
m: weight of reciprocating momentum (682 g)
F: secondary imbalanced inertial force generated at 6000 rpm
FR: secondary inertial force to be inputted to Rh mount
FL: secondary inertial force to be inputted to Lh mount When $F = mr\omega^2 p \times 4$, wherein $\omega = 2\pi f = 2\pi \times 6000/60$, thus $F = 16172(N)$ According to power balance, $$F = FR + FL \quad (2)$$

According to moment balance $$(328.5 + 122.5)FR - 122.5F = 423.5FL \quad (3)$$

From (1),(2),(3)

$$FR = 10097(N), \; FL = 6075(N) \quad (4)$$

The large secondary vibration is inputted to the left and right engine mounts and the secondary vibration of the engine is not suppressed.

Comparative Example 1B

With 82% of Balancer Apparatus

The same engine as in the Comparative Example 1A is used. The suppression effect of the secondary vibration is calculated when the balance weights (balance rate of 82%) are centrally arranged in the lower portion of the second bearing journal (see FIG. 7).

When FB is a centrifugal force by balance weight, $$FB = 0.82F \quad (5)$$

According to power balance, $$F - FB = FR + FL \quad (6)$$

According to moment balance, $$(328.5 + 122.5)FR + 122.5FB - 122.5F = 423.5FL \quad (7)$$

From (5),(6),(7)

$$FR = 1817(N), \; FL = 1094(N) \quad (8)$$

Comparative Example 2

Embodiment 1

A balancer apparatus with a balance rate of 100% is arranged in the lower portion of the third bearing journal.
In this example, the specification of the engine is:
r: radius of crank rotation (51 mm)
l: length of connecting rod (158 mm)
p: r/l (0.32)
m: weight of reciprocating momentum (530 g)
F: secondary imbalanced inertial force generated at 6000 rpm
FR: secondary inertial force to be inputted to Rh mount
FL: secondary inertial force to be inputted to Lh mount
The suppression of the secondary vibration is calculated when the balance weights with 100% balance rate is centrally arranged in the lower portion of the third bearing journal (see FIG. 8).

$$F = mr\omega^2 p \times 4, \text{ wherein } \omega = 2\pi f = 2\pi \times 6000/60, \text{ thus } F = 13658(N) \quad (9)$$

Since the balance rate is 100%, $$F = FB \quad (10)$$

(FB is a centrifugal force by balance weight)
According to power balance, $$F - FB = FR + FL \quad (11)$$

According to moment balance, $$(328.5 + 122.5)FR + 122.5FB - 122.5F = 423.5FL \quad (12)$$

From (9),(10),(11),(12)

$$FR = 0(N), \; FL = 0(N) \quad (13)$$

Comparative Example 2

Embodiment 2

A balancer apparatus of balance rate of 100% is arranged in the lower portion of the second bearing journal.

The same engine used in the comparative example 2 is used. The suppression of the secondary vibration is calculated when the balance weights with 100% of balance rate are centrally arranged in the lower portion of the second bearing journal (see FIG. 9).

Here, since the balance rate is 100%, $$F = FB \quad (14)$$

According to power balance, $$F - FB = FR + FL \quad (15)$$

According to moment balance, $$(328.5 + 122.5)FR + (122.5 + 96)FB - 122.5F = 423.5FL \quad (16)$$

From (14),(15),(16)

$$FR = -1500(N), \; FL = 1500(N) \quad (17)$$

Comparative Example 2

Embodiment 3

A percent (less than 100%) balancer apparatus in the lower portion of the second bearing journal.

The same engine as in the comparative example 2 is used. The suppression of the secondary vibration is calculated when balance weights of α% (less than 100%) are centrally arranged in the lower portion of the second bearing journal (refer to FIG. 10).

Since the balance rate is α%, $$FB=0.1\alpha F \quad (18)$$

According to power balance $$F-FB=FR+FL \quad (19)$$

According to moment balance, $$(328.5+122.5)FR+(122.5+96)FB-122.5f=423.5FL \quad (20)$$

From (18),(19),(20)

$$FR=8527.5-100.3\alpha(N)$$
$$FL=5130.5-36.3\alpha(N) \quad (21)$$

When this is illustrated in a graph, this becomes FIG. 11. FIG. 11 shows that the Rh mount input becomes 0(N) when the balance rate is 85.0% and the LH mount input becomes 0(N) when the balance rate is 141.3%.

When considering the lightweight of the balancer apparatus, friction, input load in total of RH mount and LH mount, and arranging the balance weight in the lower portion of the second bearing journal, the balance rate of 85.0% shows the best result.

Further, at this time, $$FR=0(N), FL=2045(N) \quad (22)$$

Moreover, the noise filled in the car reflects a resultant force of absolute values of FL and FR.

$$FR=|FR|+|FL| \quad (23)$$

$FR=8527.5-100.3\alpha(N)$
$FL=5130.5-36.3\alpha(N)$

In each expression of the above, α is changed from 60 to 115 successively, balance values of |FR|, |FL|, and |FR|+|FL| are obtained in the following Table 1.

TABLE 1

| Balance | |FR| | |FL| | |FR| + |FL| |
|---|---|---|---|
| 60% | 2510ₙ | 2953ₙ | 5463ᴺ |
| 70 | 1507 | 2590 | 4097 |
| 75 | 1005 | 2408 | 3413 |
| 78 | 704 | 2299 | 3003 |
| 79 | 604 | 2263 | 2867 |
| 80 | 504 | 2227 | 2731 |
| 85 | 0 | 2045 | 2045 |
| 90 | 500 | 1864 | 2364 |
| 95 | 1001 | 1682 | 2683 |
| 97 | 1202 | 1609 | 2811 |
| 98 | 1302 | 1573 | 2875 |
| 99 | 1402 | 1537 | 2939 |
| 100 | 1500 | 1500 | 3000 |
| 105 | 2004 | 1319 | 3323 |

TABLE 1-continued

| Balance | |FR| | |FL| | |FR| + |FL| |
|---|---|---|---|
| 110 | 2506 | 1138 | 3644 |
| 115 | 3007 | 956 | 3963 |

As from the above, when considering the noise filled in the car, it is understood that according to the present invention, when the balance rate is 85%, good results are obtained.

FIG. 12 is a graph showing a relation between a balance rate and the total input values of the secondary inertial force in each mount.

In this graph, it is understood that the noise filled in the car (refer to A in FIG. 13) be set as the same level as Model 5S-FE manufactured by TOYOTA JIDOSHA KABUSHIKI KAISHA (5S-FE engine described in the manual of new model cars TOYOTA SCEPTER published in Nov. 24, 1992), the balance rate may be kept at 79-99%.

Within the above extent, the noise within a car can be kept as in the practical sound level as in a room. A noise in the car is not necessarily set as 0 dB but may be allowed within a certain extent that a crew such as driver does not feel.

COMPARISON BETWEEN THE EMBODIMENTS AND THE COMPARATIVE EXAMPLES

Comparison between the Embodiment 1 and the Comparative Example 1

According to the expressions (4) and (8), when the difference in size of the secondary inertial force inputted to the RH mount is expressed by dB, $L=20 \log_{10}\{FR(\text{no balancer apparatus})/FR$ $(\text{with balancer apparatus})\}$ $=20 \log_{10}\{10097/1817\}=14.9 \text{ (dB)}$ This value is close to the difference of vibration level (with and without the balancer apparatus) at the root of the RH mount of model 5SFE manufactured by TOYOTA JIDOSHA KABUSHIKI KAISHA.

In this connection, the difference of the noise filled within the car (the noise shut in the center of the front seat) in the engine model 5SFE with and without the balancer apparatus is shown in FIG. 13. In FIG. 13, A shows without a balancer apparatus and B shows with a balancer apparatus (balance rate of 82%). The difference is 10 dB at maximum. The difference of the resultant force of the secondary inertial force input value is 16172 (N)-2911 (N)=13261 (N). A reduction of almost 1300 (N) of mount input value is an effect of reducing 1 dB of noise shut within the car. As a result, the maximum is 10 dB.

Comparison Between the Embodiment 3 and the Embodiment 10 1 and the Comparative Example 1

A relation among |FR|, |FL| and |FR|+|FL| in terms of balance value is calculated for the embodiment 1 and the comparative example 1 and then is compared with the embodiment 3.

In the embodiment 1 (with 82% balancer apparatus), |FR|: 1817 (N), |FL|: 1094 (N) |FR|+|FL|: 2911 (N)

In the comparative example 1 (without balancer apparatus), |FR|: 10097 (N), |FL|: 6075 (N) |FR|+|FL|: 16172 (N)

As from the above, the difference between mount input values 16172 (N) and 2911 (N) in referring to the noise filled in the car is 10 dB at maximum.

Comparison Between the Comparative Example 2 and the Embodiment 2

According to the expression 12 of the comparative example, the moment balance is $$(328.5+122.5)FR+122.5FB-122.5F=423.5FL$$

As compared, the moment balance in the embodiment 2 is in the expression 16, $$(328.5+122.5)FR+(122.5+96)FB-122.5F=423.5FL$$

When paying attention to the second term in each expression, in the comparative example, it is 2122.5FB, while (122.5+96)FB in the embodiment 2. This means that in the second bearing journal, FB: the centrifugal force by the balance weights is smaller when comparing with the third bearing journal.

It is well known than the size of a centrifugal force is proportion to the size of mass of an object. It means that the FB may be small is that the mass of the balance weight can be made small.

Therefore, when the balance weights are arranged in the lower location of the second bearing journal, the balance weights can be made light. This also reduces friction in the balancer apparatus.

A friction moment M at a fluid lubricating bearing is expressed as follows:

$$M=2\pi \cdot (\eta VR^2L/C).$$

Since $$V=R\omega$$

$$=2\pi \cdot (\eta VR^3L/C)(R^3) \quad (24)$$

C: radius of clearance between a balance weight and a balancer case
R: radius of balance weight axis
L: width of balance weight bearing
V: circumferential speed of balance weight
$\eta$: coefficient of kinematic viscosity
$\omega$: velocity of balance weight angle The friction moment is proportion to the cube of a diameter of bearing or width of the bearing and is inversely proportion to a clearance. When a mass of the balance weight is made light, the centrifugal force becomes small and the clearance C can be made small. Further, a surface pressure at bearing=$mr\omega^2/2RL$, as m (mass) is smaller, RL can be made small.

As a result, in the expression 23, C can be made big and RL can be made small. Thus, the friction moment can be made small.

What is claimed is:

1. A balancer apparatus for multiple cylinder engine, wherein the engine has a plurality of cylinders; connecting rods attached to a piston provided in each cylinder; each connecting rod being rotatably attached to a crank arm in a crank shaft and the crank shaft being rotatably supported by a plurality of bearing journals through each crank arm; and a transmission attached to one end of the crank shaft, and the engine generates a secondary vibration to the cylinder in accordance with the reciprocatory movement of the piston,
    wherein the balancer apparatus suppresses the secondary vibration in the engine by balance weights which are rotatably driven together with the crank shaft rotates and,
    the balance weights are centrally placed only in a space corresponding to a bearing journal counted second from the opposite side of the transmission is located.

2. A balancer apparatus for engine according to claim 1, wherein the multiple cylinder engine is a straight 4-cylinder engine in which four cylinders are arranged in line, each connecting rod is attached to a piston provided in each cylinder and is further attached to a crank arm of the crank shaft, the crank shaft is rotatably supported by a plurality of bearing journals through each crank arm and a transmission is connected to one end of the crank shaft.

3. A balancer apparatus for engine according to claim 1, wherein a space is provided in the transmission side which corresponds to the bearing journals are located.

4. A balancer apparatus for engine according to claim 3, further comprises an oil pan for containing oil in the form of enclosing the balancer apparatus is provided in the lower portion of the engine and a recessed portion which enters into the space is formed therein.

* * * * *

UNITED STATES PATENT AND TRADEMARK OFFICE
CERTIFICATE OF CORRECTION

PATENT NO.   : 5,875,753                                              Page 1 of 1
DATED        : March 2, 1999
INVENTOR(S)  : Makoto Ishikawa It is certified that error appears in the above-identified patent and that said Letters Patent is hereby corrected as shown below:

<u>Column 10,</u>
Lines 14-45, delete claims 1-4 and insert the following claims:
-- 1.   A balancer apparatus for a multiple cylinder engine wherein the engine has a plurality of cylinders comprising:
   connecting rods attached to a piston provided in each cylinder, wherein each connecting rod being rotatably attached to a crank arm in a crank shaft and the crank shaft being rotatably supported by a plurality of bearing journals through each crank arm; and
   a transmission attached to one end of the crank shaft, said engine generates a secondary vibration to the cylinder in accordance with a reciprocatory movement of the piston,
   wherein the balancer apparatus suppresses the secondary vibration in the engine by balance weights which are rotatably driven together when the crank shaft rotates and,
   the balance weights are centrally placed in a first space corresponding to a bearing journal located second from an opposite side of where the transmission is located, wherein the multiple cylinder engine is at least a straight 4-cylinder engine 2.   The balancer apparatus for an engine according to claim 1, wherein a second space is provided between the transmission side and said first space, and wherein bearing journals are located.

3.   The balancer for an engine according to claim 2, further comprises an oil pan for containing oil, said oil pan enclosing the balancer apparatus and being provided in a lower portion of the engine and in a recessed portion, said recessed portion incorporating said second space. --

Signed and Sealed this

Twenty-fourth Day of September, 2002

Attest:

Attesting Officer

JAMES E. ROGAN
*Director of the United States Patent and Trademark Office*